July 31, 1956  W. H. CAMPBELL  2,756,797
PNEUMATIC TIRE TREAD
Filed March 2, 1953

*INVENTOR.*
WILLIAM H. CAMPBELL
BY
*R. L. Miller*
ATTORNEY

United States Patent Office 2,756,797
Patented July 31, 1956

2,756,797

PNEUMATIC TIRE TREAD

William H. Campbell, Silver Lake, Cuyahoga Falls, Ohio, assignor, by mesne assignments, to The Goodyear Tire & Rubber Company, a corporation of Ohio Application March 2, 1953, Serial No. 339,822

1 Claim. (Cl. 152—209)

This invention relates to improvements in treads of pneumatic tires molded from rubber or rubber-like material. In particular, the invention concerns improvements in pneumatic tires having circumferential antiskid grooves so constructed as to prevent or substantially reduce tread groove cracking.

In tire treads having conventional designed grooves, localized stresses occur at the base of the groove when the tread is under compression. This localization of stresses causes relatively weak points to be formed with the result that cracks appear in the region of the groove base. When cracks at the groove base appear, that portion of the tread becomes further weakened by continual flexing of the tire casing and ultimately the cushion and carcass of the tire are so weakened as to allow dirt and moisture to enter, thereby resulting in premature failure of the tire.

Heretofore, the problem of preventing tire groove cracking has been serious and has received much attention by tire engineers. Attempts have been made to prevent tire tread groove cracking by adding chemicals to the rubber compound to change some of its characteristics, or by slitting the ribs of the tire so as to relieve localized stressing, or by deforming the base of the groove so as to divert cracks which occur. However, the results of these attempts to prevent or reduce tire groove cracking have not been satisfactory.

The present invention provides a tire tread groove having greatly improved resistance to groove cracking while maintaining the required standards of groove depth for tires of a given size and of tread contact area to provide maximum wear. Experiments have shown that tires having conventional designed tread grooves develop one or more lips, or sharp indentations, in the side wall of the groove when it is placed under load. It has been found that the formation of these lips in the groove side wall under load conditions is the basic defect in current tread designs which ultimately results in tread groove cracking.

The present invention provides a tire tread groove which does not deform under compression, or load conditions, into a configuration having in cross section sharp indentations, angles or lips.

An object of the present invention is to reduce tread groove cracking by simple and efficient means and without incurring any substantial manufacturing expense.

A further object is to reduce tread groove cracking by improving the tread groove design so that stresses developed under load conditions are uniformly distributed over the side walls of the groove, resulting in a cross section having a large curved, symmetrical and smooth contour.

Other important objects and advantages of the tread design of the present invention will be apparent from the following description thereof.

Figure 1:
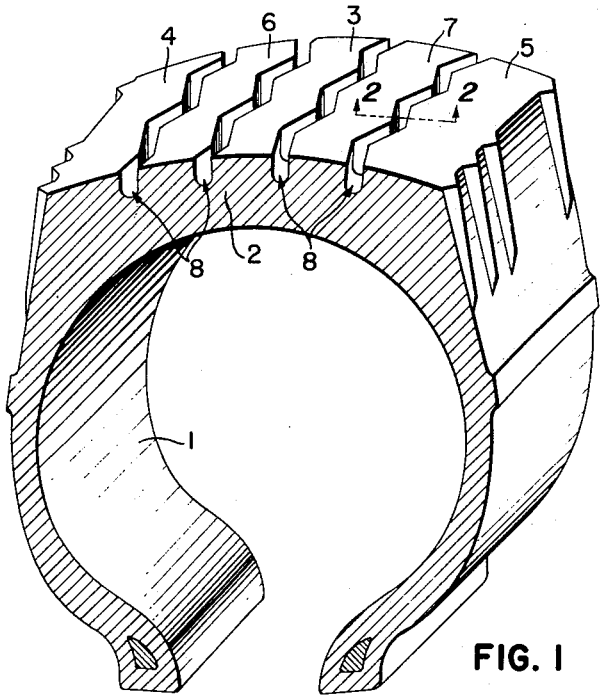
Fig. 1 is a perspective view of a tire incorporating a preferred form of the present invention, with portions in section and broken away.

Referring first to Fig. 1 of the drawing, a pneumatic tire is shown comprising a carcass 1 having a tread generally referred to by the numeral 2. The tread includes a plurality of circumferential antiskid elements, comprising a center rib 3, shoulder ribs 4 and 5, and intermediate ribs 6 and 7 which define grooves 8. While the present invention is illustrated by a tire tread of a saw-toothed antiskid tread pattern having five ribs, as shown, it is to be understood that the invention is not dependent upon the tread pattern or the number of ribs in the tread but can be adapted to tread patterns of other well known forms with any number of tread ribs.

Figure 2:
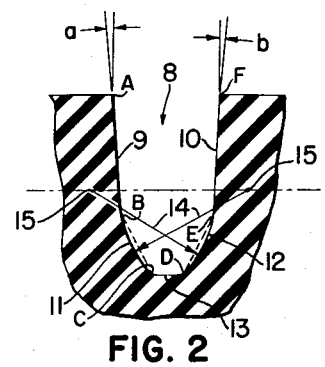
Fig. 2 is a sectional view on line 2—2 of Fig. 1.

Referring to Fig. 2 of the drawing, the groove 8, shown in cross section, has upper side wall portions 9 and 10 which are inclined radially inwardly to a line parallel to the tread radius passing through the center of the groove. It is intended that the angles "a" and "b" preferably are approximately 4° but they may vary between zero and 15°. The side walls 9 and 10 extend respectively from points A and F to first points B and E which are located at approximately the same groove depth. The lower side wall portions 11 and 12 arcuately converge respectively to second points C and D which define the limits of the flat bottom 13 of the groove. The points C and D are located at the intersection of straight lines drawn respectively through points B and E at an included angle of approximately 160° from the upper side wall portions 9 and 10, although included angles varying between 145° and 175° have been found to be satisfactory. The lower side wall portions are respectively formed by a large arc, or a sector of a circle. The centers 15 of the radii 14 of the lower side wall portions 11 and 12 are respectively located in the cross sectional area of the rib opposite to the respective lower side wall. For example, the center of the radius for the arc or sector 11 is located in the cross sectional area of the rib having a face forming the side wall 10.

Figure 3:
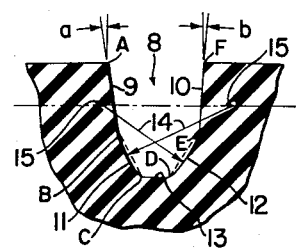
Fig. 3 is a sectional view illustrating a modified form of the invention as shown in Fig. 2.

Referring to Fig. 3 of the drawings it will be seen that the lower side wall portions 11 and 12 are respectively formed by arcs, or sectors of a large circle, having radii located within the cross sectional area of the opposite rib. The first points B and E are located at approximately the same groove depth. In the present modification, the distance measured parallel to the tread radius, between points A and B have been decreased but the distance, measured parallel to the tread radius, between the first points and the flat bottom has been maintained approximately constant to that shown in Fig. 2, but may vary between approximately one third and seven tenths of the total groove depth.

Figure 4:
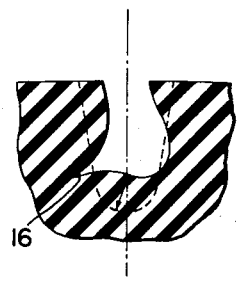
Fig. 4 is a sectional phantom view of a conventional round bottomed groove, and a sectional view of such a groove under load.

Referring now to Fig. 4 of the drawing, a conventional groove design is shown in dotted lines having a rounded or filleted groove bottom formed by an arc with a radius of curvature located, as shown, on the tread radius passing through the center of the groove. Experiments have shown that such a groove when placed under compression will form a contour having a sharp indentation or lip 16 which is caused by a localization of stresses. Continual flexing of a tire casing incorporating such a tread design causes continual deformation at the point of the lip and eventually causes a crack to be formed. After formation of such cracks, repeated deflection of the tire casing causes the crack to creep or expand into the tread cushion providing access thereto for moisture and foreign material and resulting in eventual rupture of the carcass.

Figure 6:
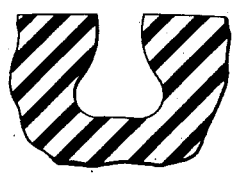
Fig. 6 is a sectional view showing the groove of this invention under load.

It has been found by experiments, that the groove design shown in Figs. 2 and 3 prevents the localization of stresses when the tread is under compression. The stresses are distributed uniformly throughout the groove side wall so that under compression the tread assumes a large curved, symmetrical and smooth contour of a configuration generally shown in Fig. 6. It is to be particularly noted, that no lip, such as shown in Fig. 4, or sharp corners are formed. It is thus seen that the invention as shown in Figs. 2 and 3 consists of a groove tread having a flat bottomed portion and side walls of a particular design which prevent localization of stresses when under compression and thereby avoid or substantially reduce tread groove cracking.

Figure 5:
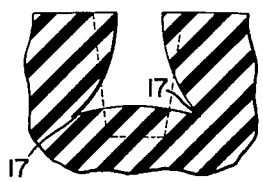
Fig. 5 is a sectional phantom view of a conventional flat bottomed groove, and a sectional view of such a groove under load.

A conventional groove design having straight converging side walls and a flat bottom, as shown in Fig. 5 by the dotted lines, will form two sharp indentations or lips 17 when placed under compression. The lips are caused by localization of stresses and continual flexing of a tire incorporating such design will result in cracking of the tread groove.

The preferred embodiments of the present invention are each illustrated and described as having a flat bottom portion or base 13, which connotes that in cross section the bottom of the groove is formed by a straight line. However, it is to be understood that the bottom portion may be otherwise formed without departing from the spirit or scope of the present invention, so long as, the bottom is substantially flat. For example, the bottom portion 13 may be formed, in cross section, by a curved line having a relatively large radius of curvature so that the bottom portion of the groove approximates a substantially flat surface.

While certain representative embodiments and details have been shown for the purpose of illustrating the invention, it will be apparent to those skilled in this art that various changes and modifications may be made therein without departing from the spirit or scope of the invention.

I claim:

A pneumatic tire construction comprising a tread portion formed with a plurality of circumferentially-extending ribs defining intervening grooves having, in cross-section, upper sidewall portions, lower sidewall portions, and a substantially flat bottom portion, each respective upper sidewall portion extending radially inward of said tread and substantially parallel to the tread radius passing through the center of the respective groove to a respective first point located at approximately two-thirds the depth of the groove, each respective lower sidewall portion arcuately converging toward said radius and formed by an arc passing through said first point and a respective second point, said second point located at the intersection of said flat bottom portion and a straight line drawn through the first point at an angle of approximately 160° to said upper sidewall portion, the center of said arc being located within the cross-sectional area of the rib defining the upper sidewall portion opposing said lower sidewall portion.

References Cited in the file of this patent

UNITED STATES PATENTS

| | | |
|---|---|---|
| 917,733 | Kempshall | Apr. 6, 1909 |
| 2,274,855 | Wallace | Mar. 3, 1942 |
| 2,290,625 | Stein | July 21, 1942 |
| 2,604,920 | Kirby | July 29, 1952 |
| 2,637,362 | Briscoe | May 5, 1953 |